May 13, 1941.  W. M. COOPER  2,241,699
APPARATUS FOR PLANT IRRIGATION
Filed Sept. 21, 1939
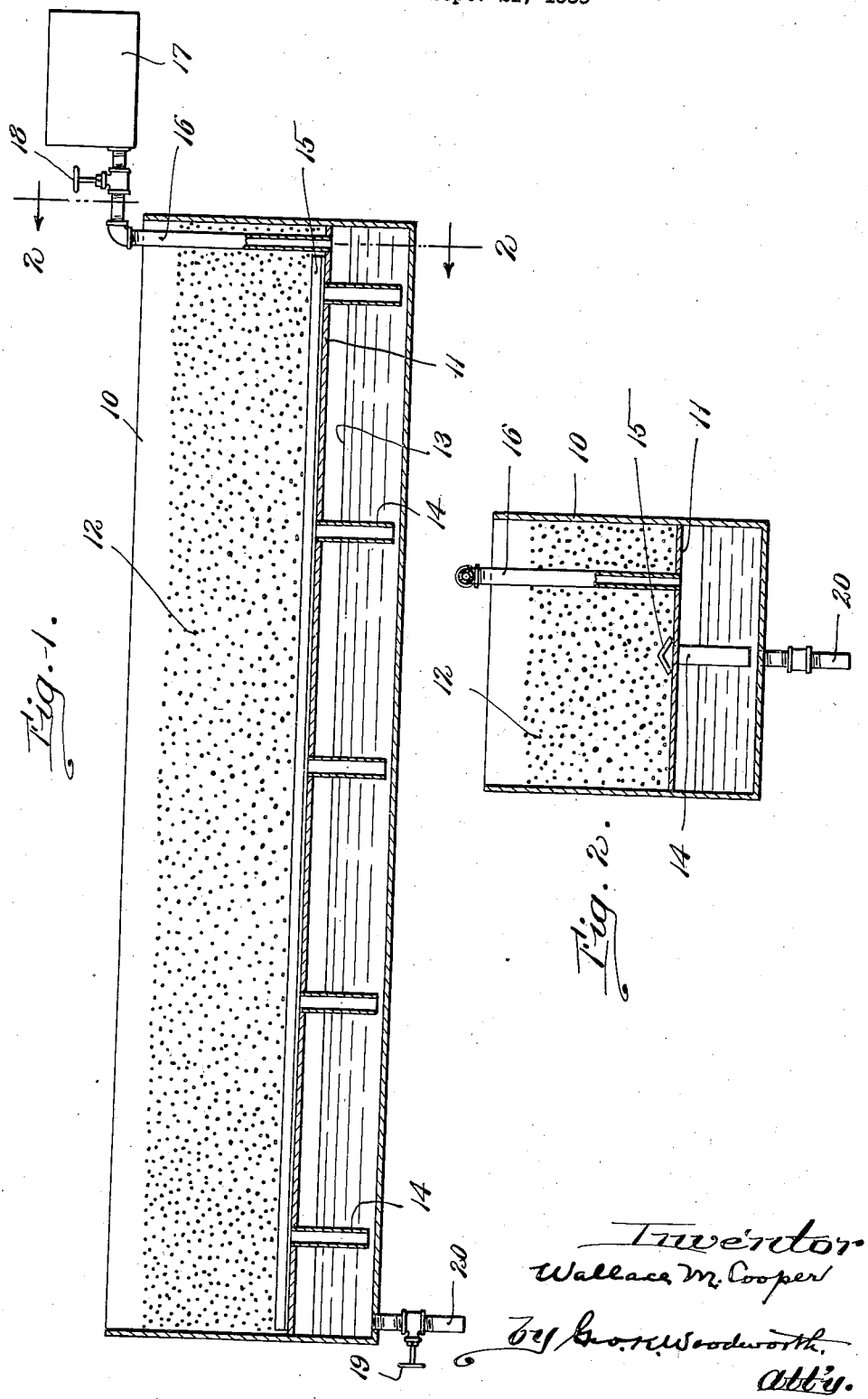

Patented May 13, 1941

2,241,699

UNITED STATES PATENT OFFICE 2,241,699

APPARATUS FOR PLANT IRRIGATION

Wallace M. Cooper, Weston, Mass.

Application September 21, 1939, Serial No. 295,849

4 Claims. (Cl. 47—1.2)

This invention relates to plant culture and more particularly to the culture of plants in soils or inert matter, such as sand, or the like, contained in receptacles.

The principle object of my invention is to provide a novel and improved apparatus for irrigating and simultaneously aerating plants grown in soils or inert matter contained in receptacles. With this object in view, my invention comprises means whereby a liquid, which may be water, sterilized or otherwise, or a solution of fertilizing material, may be forced pneumatically upward from a lower compartment into the mass of soil or inert matter in which the plants are bedded to irrigate said plants and simultaneously drive out of said matter some of the air and gases therein contained, and then, when such pressure is relieved, caused to flow back into its container and simultaneously draw atmospheric air through the matter.

Various other objects of my invention and a means for attaining them will hereinafter appear.

The drawing which accompanies and forms a part of this specification represents more or less conventionally an apparatus whereby my objects may be attained.

In said drawing, Figure 1 is a longitudinal section and Fig. 2, a transverse section taken on the line 2—2 of Fig. 1.

In the particular drawing selected for illustrating the principle underlying my invention, 10 is an uncovered receptacle divided into an upper and lower compartment by the longitudinally extending partition 11, which is so secured to the walls of said receptacle as to make an airtight joint therewith, the lower compartment being as shown of smaller cubical content than the upper, which is the preferable, although not essential, construction.

The upper compartment is filled to the desired height with soil, sand, gravel, or other suitable plant-supporting matter 12 and the lower compartment contains a quantity of liquid 13, such as water, which may be sterilized, or any suitable fertilizing solution. As shown, the volume of the liquid in the lower compartment is approximately one half that of the plant supporting matter in the upper compartment, and, for the best results, the cubical content of the lower compartment is somewhat greater than the volume of liquid therein contained. Means affording communication between the lower portion of the lower compartment and the lower portion of the upper compartment must be provided so that said liquid when subjected to air pressure will rise into the upper compartment. In the present instance such means consist in one or more pipes 14 herein shown as five in number, although, of course, my invention is not limited in this respect, which are secured to and depend from said partition 11 and in the present instance the upper end of each pipe is substantially flush with the upper surface of the partition and the lower end thereof is shown as being slightly above the bottom of the lower compartment.

Preferably, means are employed for preventing the passage of the matter 12 through the pipes 14 and in the present instance such protection is afforded by the inverted trough 15 interposed between said matter and the upper end of the pipes. The edges of this trough rest on the partition and although they are pressed against the latter by the weight of the sand, the joint between the trough and the partition is not water tight so that the liquid passing upwardly through the pipe will readily escape into the upper compartment, and in like manner, when the pneumatic pressure aforesaid is relieved, such liquid will readily pass the edges of the trough and flow back through the pipe into the lower compartment.

Any suitable means may be provided for exerting pressure pneumatically upon the upper surface of the fertilizing solution 13, and in the present instance, I have shown for illustrative purposes merely, a conduit 16 rising from the partition 11 and having its lower end substantially flush with the under surface thereof, said conduit affording a means whereby pressure may be transmitted to the liquid in the lower compartment to force the same through the pipe or pipes 14 into and through the matter in the upper compartment but not out of the latter. As the liquid passes into the upper compartment and through interstices between the particles of the mass of matter therein contained, a portion of the interstitial air and gases therein will be driven out and when such pressure is relieved, the liquid will flow back into the lower compartment and at the same time draw atmospheric air through such interstices.

While a variety of means may be employed for exerting pressure on the liquid pneumatically, I have in the present instance indicated at 17 a source of compressed air or other suitable gas connected with the conduit 16 by the two-way valve 18 whereby pneumatic pressure is put on the liquid when the valve is in one position and released when it is in another. In the case of small receptacles, such as window boxes, sufficient pressure may be put on the liquid by applying the lips to the pipe 16 or to a piece of rubber tubing attached thereto and blowing therethrough.

It is to be understood, of course, that I do not limit my system to the particular means whereby pressure is exerted on the liquid in the lower compartment.

After the liquid has become unsuitable for use, the valve 19 may be opened and the lower compartment drained through the pipe 20. If the liquid contains fertilizing matter and the concentration becomes unduly increased through evaporation or plant transpiration, water, sterilized or otherwise, poured into the upper compartment will readily flow to the lower compartment and restore the fertilizing liquid to its proper strength.

Having thus described in detail an apparatus embodying my invention, without however limiting myself to the details thereof, what I claim and desire to secure by Letters Patent is:

1. An apparatus for plant irrigation comprising in combination an uncovered receptacle having an upper and a lower compartment, a mass of plant supporting matter in said upper compartment, a quantity of fertilizing solution in said lower compartment, the volume of said solution being approximately one-half that of said plant supporting matter, means affording communication between the lower portion of said lower compartment and the lower portion of said upper compartment and means whereby pressure may be exerted pneumatically upon the upper portion of said fertilizing solution and the latter forced from the lower compartment into and through the interstices between the particles of said plant supporting matter but not out of the upper compartment.

2. An apparatus for plant irrigation comprising in combination an uncovered receptacle having an upper and a lower compartment, a mass of plant supporting matter in said upper compartment, a quantity of fertilizing solution in said lower compartment, the volume of said solution being approximately one-half that of said plant supporting matter, means affording communication between the two compartments, said means extending into the fertilizing solution, and means whereby pressure may be exerted pneumatically upon the upper portion of said fertilizing solution and the latter forced from the lower compartment into and through the interstices between the particles of said plant supporting matter but not out of the upper compartment.

3. An apparatus for plant irrigation comprising in combination an uncovered receptacle having an upper and a lower compartment, a mass of plant supporting matter in said upper compartment, a quantity of fertilizing solution in said lower compartment, the volume of said solution being approximately one-half that of said plant supporting matter and the cubical content of said lower compartment being somewhat greater than the volume of the fertilizing solution contained therein, means affording communication between the lower portion of said lower compartment and the lower portion of said upper compartment and means whereby pressure may be exerted pnuematically upon the upper portion of said fertilizing solution and the latter forced from the lower compartment into and through the interstices between the particles of said plant supporting matter but not out of the upper compartment.

4. An apparatus for plant irrigation comprising in combination an uncovered receptacle having an upper and a lower compartment, the lower compartment being of smaller cubical content than the upper, a quantity of fertilizing solution in said lower compartment, a mass of plant-supporting matter in said upper compartment, means affording communication between the lower portion of said lower compartment and the lower portion of said upper compartment, and means whereby pressure may be exerted pneumatically upon the upper surface of said fertilizing solution and the latter forced pneumatically from the lower compartment into but not out of the upper compartment.

WALLACE M. COOPER.